US012680632B2

(12) United States Patent
Nakano et al.

(10) Patent No.: US 12,680,632 B2
(45) Date of Patent: Jul. 14, 2026

(54) FLEXIBLE TUBE ASSEMBLY

(71) Applicant: TOFLE CO., INC., Osaka (JP)

(72) Inventors: Katsutoshi Nakano, Suita (JP);
Toshikuni Ishii, Hagi (JP); **Takeo
Nozaki**, Yasu (JP)

(73) Assignee: TOFLE CO., INC., Osaka (JP)

( * ) Notice: Subject to any disclaimer, the term of this
patent is extended or adjusted under 35
U.S.C. 154(b) by 393 days.

(21) Appl. No.: 18/511,561

(22) Filed: Nov. 16, 2023

(65) Prior Publication Data

US 2025/0164043 A1     May 22, 2025

(51) Int. Cl.
F16L 11/15 (2006.01)
F16L 23/028 (2006.01)

(52) U.S. Cl.
CPC ........... F16L 11/15 (2013.01); *F16L 23/0286*
(2013.01)

(58) Field of Classification Search
CPC ..... F16L 11/15; F16L 23/028; F16L 23/0283;
F16L 23/0286; F16L 23/032; F16L
25/0036; F16L 25/0045; F16L 25/0063;
F16L 33/01; F16L 27/1085; F16L 27/111;
F16L 27/11
USPC ......................................... 285/903, 415, 226
See application file for complete search history.

(56) References Cited

U.S. PATENT DOCUMENTS

| | | | | |
|---|---|---|---|---|
| 1,981,777 | A | * | 11/1934 | Brinkman ............. F16L 33/224 |
| | | | | 285/415 |
| 2,583,956 | A | * | 1/1952 | Monroe .................. F16L 33/26 |
| | | | | 285/256 |

| | | | | |
|---|---|---|---|---|
| 2,848,254 | A | * | 8/1958 | Millar ..................... F16L 33/26 |
| | | | | 285/415 |
| 4,063,757 | A | * | 12/1977 | Fuhrmann ............... F16L 33/01 |
| | | | | 285/903 |
| 4,805,942 | A | * | 2/1989 | Goodridge .............. F16L 33/01 |
| | | | | 285/222.1 |
| 6,173,995 | B1 | * | 1/2001 | Mau ........................ F16L 33/01 |
| | | | | 285/903 |
| 6,378,914 | B1 | * | 4/2002 | Quaranta ............ F16L 25/0036 |
| | | | | 29/520 |
| 8,870,232 | B2 | * | 10/2014 | Kramer, Jr. ......... F16L 25/0045 |
| | | | | 285/903 |
| 9,541,225 | B2 | * | 1/2017 | Strunk ................ F16L 25/0036 |
| 10,935,171 | B1 | * | 3/2021 | Nakano ................... F16L 11/15 |

(Continued)

FOREIGN PATENT DOCUMENTS

JP          5786073 B1     9/2015

*Primary Examiner* — David Bochna
(74) *Attorney, Agent, or Firm* — BUCHANAN
INGERSOLL & ROONEY PC

(57)          ABSTRACT

A flexible tube assembly includes a metal tube having large
diameter portions and small diameter portions positioned
alternately along a longitudinal axis of the metal tube; a wire
braiding mounted around the metal tube; a first ring fitted in
one of the small diameter portions of the metal tube; a
second ring positioned to secure the wire braiding around
the first ring; a first annular member and a second annular
member positioned on opposite sides of the first ring and the
second ring, the first annular member and the second annular
member being configured to be assembled by approaching
toward each other along the longitudinal axis and, in an
assembled condition, at least one of the first annular member
and the second annular member surrounds cut wire ends of
the wire braiding unexposed.

5 Claims, 9 Drawing Sheets

(56) References Cited

U.S. PATENT DOCUMENTS

2002/0033601 A1 * 3/2002 Mullen, Jr. ......... F16L 25/0036
285/149.1

* cited by examiner

FLEXIBLE TUBE ASSEMBLY

FIELD

The present invention relates to a flexible tube assembly.

BACKGROUND

JP 5786073 B discloses a flexible tube assembly. The flexible tube assembly comprises a flexible metal tube. The metal tube comprises large diameter portions and small diameter portions alternately formed in a direction along the longitudinal axis of the metal tube. An inner is fitted on each end of the metal tube. The metal tube and the inner rings are covered with a cylindrical woven wire braiding. Each end of the wire braiding is fastened on the inner ring by an outer rings. A disk-like flange plate is mounted around the outer ring. The flange plate comprises an annular inwardly recessed step. The recessed step is defined at a corner of the inner peripheral surface of the flange plate and accommodates the inner ring, the outer ring, and an end portion of the wire braiding held between the inner and outer rings. To prevent the wire braiding from leaving away from the region between the inner and outer rings, the distal end of the wire braiding is welded to the inner and outer rings.

To secure a necessary pressure resistance, the welding should be done in a highly quality controlled environment or manufacturing plant, rather than in the field. This means that a various length of tube assemblies manufactured under the quality controlled environment should be prepared for respective installation sites.

SUMMARY OF THE INVENTION

To solve the above inconveniences, one aspect of the present of the invention provides a flexible tube assembly (1), comprising:
  a metal tube (11) comprising large diameter portions (12) and small diameter portions (13) positioned alternately along a longitudinal axis of the metal tube (11);
  a wire braiding (15) mounted around the metal tube (11); and
  a mechanism (10) mounted on one end of the meal tube (11) and associated one end of the wire braiding (15) to connect the one end of the metal tube (11) with the associated one end of the wire braiding (15);
  wherein the mechanism (10) comprises
    a first ring (16) positioned between the metal tube (11) and the wire braiding (15) and fitted in one of the small diameter portions (13) of the metal tube (11);
    a second ring (30) positioned around the first ring (16) and the wire braiding (15) to secure the wire braiding (15) around the first ring (16);
    a first annular member (50) and a second annular member (35) positioned on opposite sides of the first ring (16) and the second ring (30) with respect to a direction along a longitudinal axis (14) of the metal tube (11), the first annular member (50) and the second annular member (35) being configured to be assembled with each other by approaching toward each other along the longitudinal axis (14) and, in an assembled condition, at least one of the first annular member (50) and the second annular member (35) surrounds cut wire ends of the wire braiding (15) unexposed.
According to the flexible tube assembly, the wire braiding (15) is secured between the inner and second ring without using welding, allowing the tube assembly to be assembled at the installation site, which avoids a variety sizes of assembled tube assemblies be produced and stocked, in the manufacturing plant. Also, the wire cut ends of the wire braiding are surrounded by the first and/or second annular member and unexposed, preventing operators from being injured by the contact with the cut wires.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the art in the pertinent art to make and use the same.

DETAILED DESCRIPTION OF THE PREFERRED EMBODIMENTS

Discussions will be made to one embodiment of a flexible tube assembly according to the invention.

Figure 1:
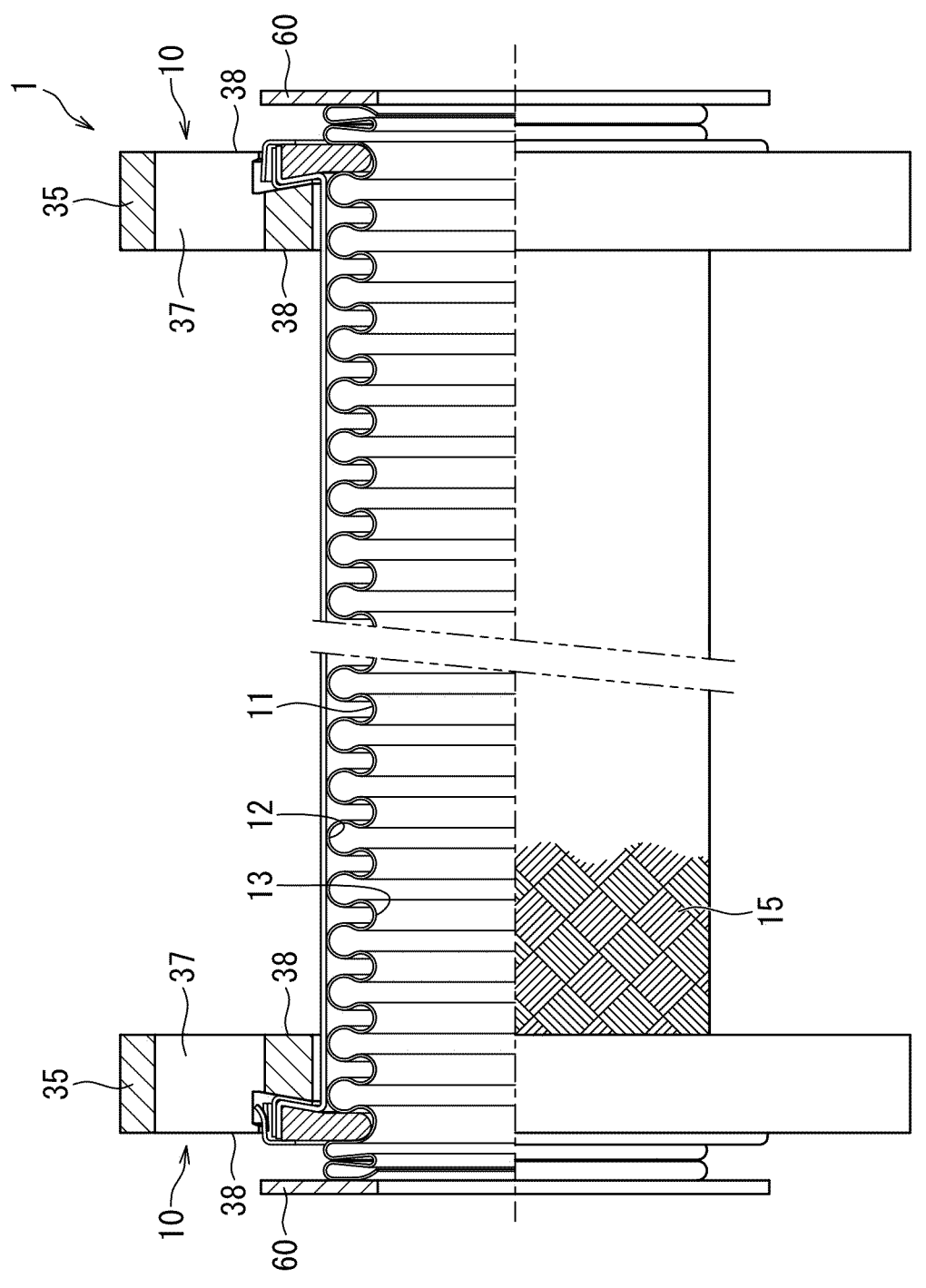
FIG. 1 is a partially cut-away side view of a flexible tube assembly according to one aspect of the invention.

FIG. 1 shows an embodiment of the flexible tube assembly generally indicated by reference numeral 1. The tube assembly 1 has a connection mechanism, generally indicated by reference numeral 10 at opposite left and right ends of the tube assembly 1. In the embodiment, the left and right side connection mechanisms 10 have the same construction and therefor the following discussions will be made to the left side connection mechanism 10.

Figure 2:
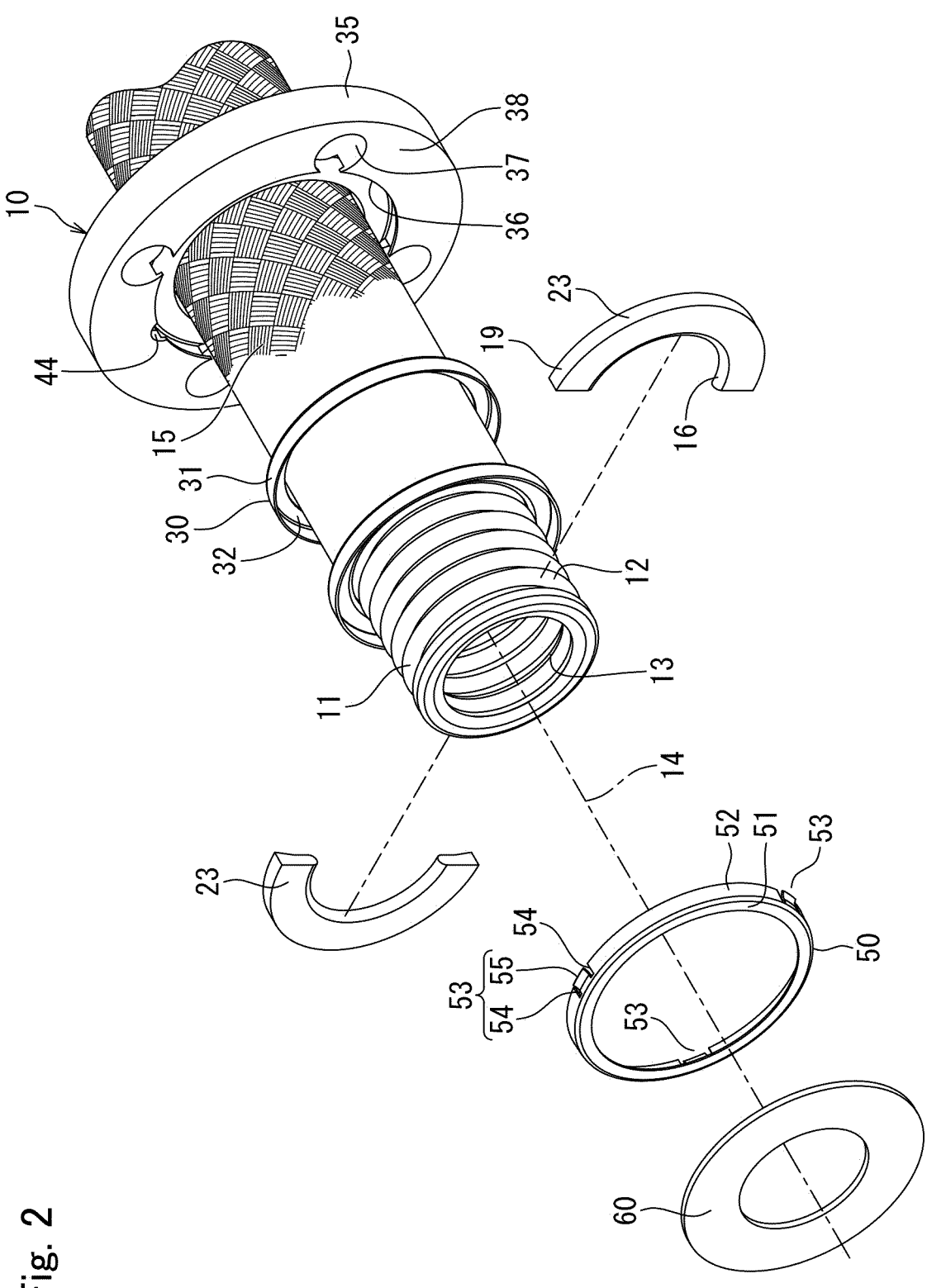
FIG. 2 is an exploded perspective view of the flexible tube assembly in FIG. 1.

As shown in FIG. 2, the tube assembly 1 has a flexible metal tube 11. The metal tube 11 may be made of appropriate metal such as stainless steel. To provide flexibility, the metal tube 11 has large diameter portions 12 and small diameter portions 13 alternately formed in a direction along a longitudinal axis 14 of the metal tube 11.

A cylindrical woven wire braiding 15 is mounted on substantially the entire length of the metal tube 11.

The metal tube 11 and the wire braiding 15 support, at respective ends of the metal tube 11 and the wire braiding 15, the connection mechanism 10 configured to be connected with associated connection mechanism of tube assembly not shown.

Figure 3:
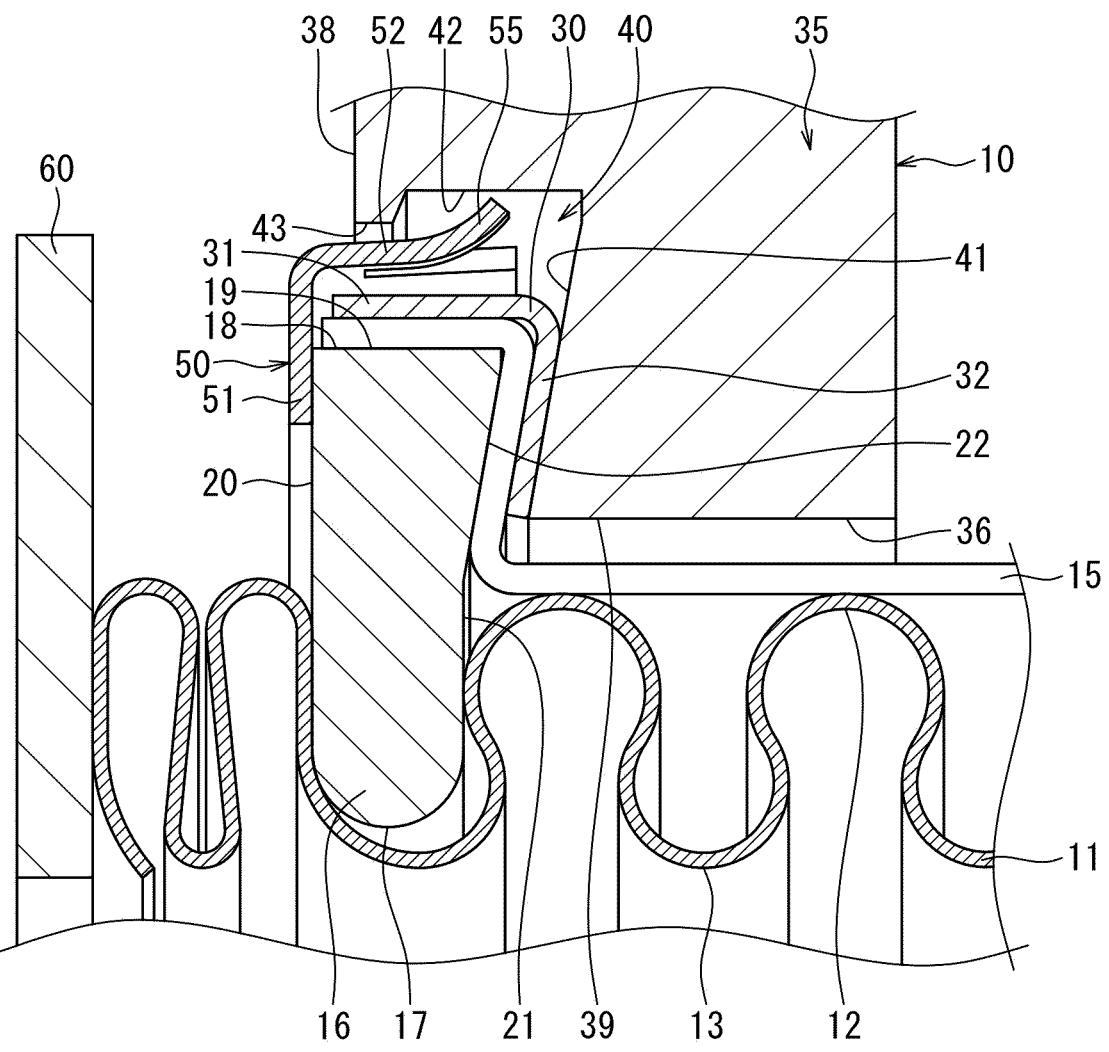
FIG. 3 is an expanded partial cross sectional view of a connecting mechanism.
Figure 4:
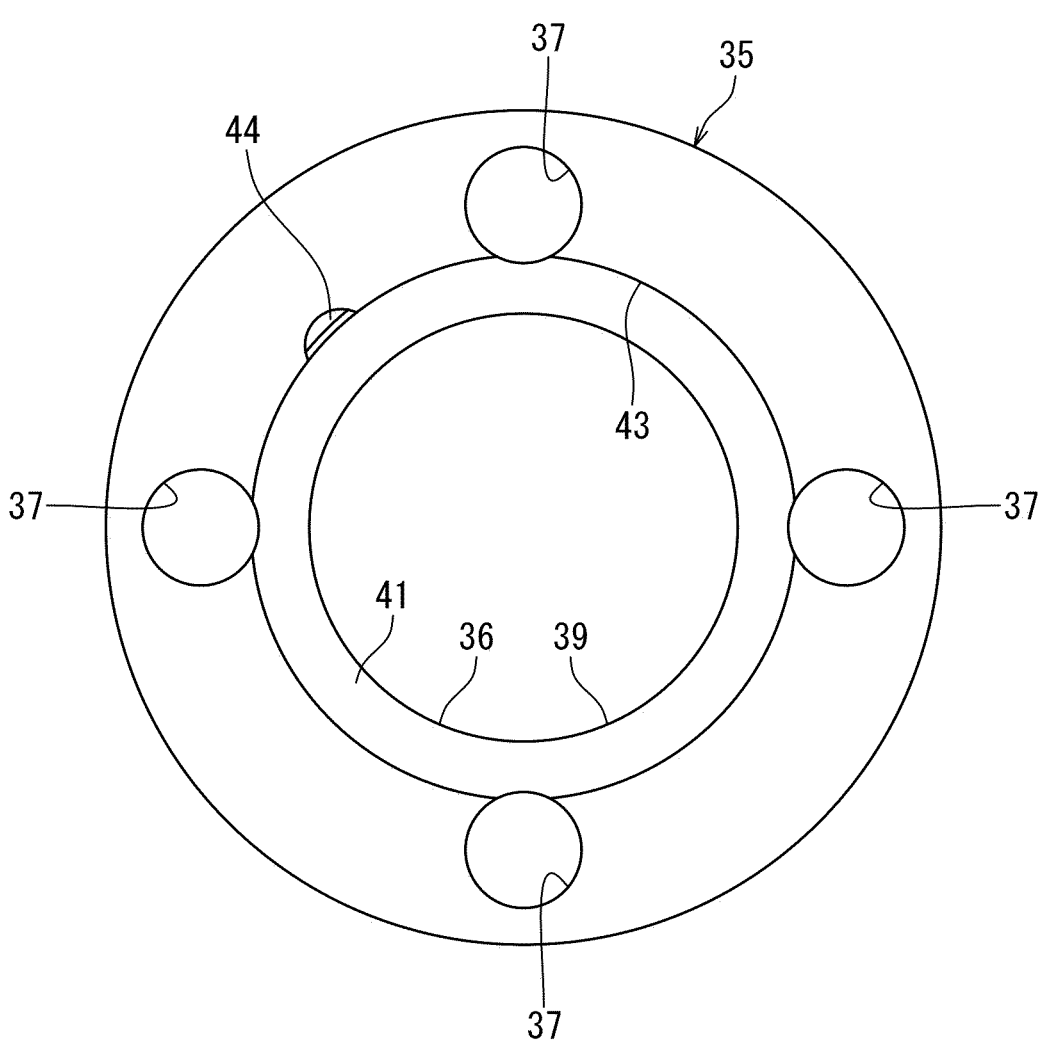
FIG. 4 is a front view of a flange plate.

The connection mechanism 10 comprises an inner ring (first ring) 16. The inner ring 16 is fitted in one small diameter portion 13 close to the distal or free end of the metal tube 11. Preferably, as shown in FIG. 3, the inner ring 16 is fitted in the second small diameter portion 13 counted from the distal end side the metal tube 16 to leave two large diameter portions 12 on the distal end side of the metal tube 11.

Preferably, the inner ring 16 is made of metal, such as stainless steel. Preferably, as shown in FIG. 3, the inner ring 16 has an inner diameter substantially the same as the outer diameter of the small diameter portions 13. Preferably, an innermost end 17 of the inner ring 16 is rounded, in match with the associated rounded small diameter portions 13. Preferably, an outermost end 18 of inner ring 16 has a flattened cylindrical peripheral surface portion 19 extending in parallel to the longitudinal axis 14. Preferably, an outer radial surface portion 20, close to the distal or free end of the metal tube 11, extends substantially orthogonally to the longitudinal axis 14. Preferably, an inner radial surface portion 21, away from the distal or free end of the metal tube 11, extends radially outwardly from the innermost end and orthogonally with respect to the longitudinal axis 14 and then at an intermediate point, angled away from the outer radial surface portion 20 toward the outermost end 18 of the inner ring 16 to form a radially outwardly extending inversely tapered radial surface portion 23.

Preferably, as shown in FIG. 2, the inner ring 16 has two halves 23. This allows the inner ring 16 to be fitted in the small diameter portion 13 by fitting respective halves 23 into the small diameter 13, or annular recess, from radially outside.

The distal end of the wire braiding 15 is fixedly secured to the inner ring 16 by an outer ring (second ring) 30. Preferably, the outer ring 30 is made by stamping a disc-like stainless plate. Preferably, the outer ring 30 has a peripheral ring portion 31 and a radial ring portion 32 connected to one end of the peripheral ring portion 31. The peripheral and radial ring portions 31 and 32 are fitted on the peripheral and radial surface portions 19 and 23 of the inner ring 16, respectively, to hold the associated portions of the wire braiding 15 between the inner and outer rings 16 and 30.

The connection mechanism 10 further comprises an annular flange plate (second engagement member) 35 and a cover ring (first engagement member) 50.

In the embodiment, the flange plate 35 has a central through-hole 36 having an inner diameter larger than the outer diameter of the wire braiding 15. Preferably, for the connection with the associated tube assembly using bolts (not shown), the flange plate 35 has four or more through-holes 37 extending between opposed major surfaces 38 of the flange plate 35 and spacing a regular interval in the peripheral direction.

The flange plate 35 has an annular recess or recessed step 40, at a corner or one end of the inner peripheral surface of the central through-hole 36. Preferably, the recessed step 40 has a radial wall portion 41 extending radially outwardly from the inner peripheral surface 39 of the central through-hole 36 and an annular peripheral wall portion 42 extending axially from the radially outermost end of the radial wall portion 41 toward the adjacent major surface 38 of the flange plate 35. Preferably, the radial wall portion 41 is tapered with respect to the central axis of the flange plate 35 to define an acute angle between the radial wall portion 41 and the peripheral wall portion 42. Preferably, the taper angle is substantially the same as the taper angle of the inner radial surface portion 21 of the inner ring 16.

The peripheral wall portion 42 has an annular projection (second engagement portion) 43 projecting radially inwardly from the peripheral wall portion 42 and extending around the longitudinal axis 14. Preferably, the annular projection 43 is defined integrally with the peripheral wall portion 42 in a close proximity to the adjacent major surface 38. Preferably, the annular projection 43 has an inner diameter greater than the outer dimeter of the outer ring 30.

As shown in FIG. 2, the annular projection 43 has a recessed guide slope 44. The guide slope 44 is formed at an end portion of the annular projection 43, adjacent the major surface 38 and away from the radial wall portion 41, by chipping a portion of the annular projection 43 obliquely and radially inwardly.

Preferably, the cover ring 50 is made of stainless steel. Preferably, the cover ring 50 has a peripheral ring portion 51 and a radial ring portion 52 connected to one end of the peripheral ring portion 51. Preferably, peripheral and radial ring portions 51 and 52 are formed from a disk-like stainless plate by stamping.

The stamped cover ring 50 is formed with a plurality engagement portions (first engagement portions) 53 positioned at a regular interval in the peripheral direction of the cover ring 50. In this embodiment, the peripheral ring portion 51 of the cover ring 50 has three engagement portions 53 spaced 120 degrees away from each other. The engagement portion 53 has two elongate cutouts 54 axially extending from the peripheral edge of the peripheral ring portion 51 and an elastically deformable spring portion 55 defined between the cutouts 54. Preferably, the spring portion 55 project radially outwardly from the peripheral ring portion 51. Preferably, as shown in FIG. 3, the spring portion 55 is curved radially outwardly from the proximal end toward the distal end of the spring portion 55.

The peripheral ring portion 51 has an outer diameter substantially the same as the inner diameter of the annular projection 43. Preferably, a height of the spring portion 55 is determined such that, axially opposing the flange plate 35 and the cover ring 50 to each other with central axes of the flange plate 35 and the cover ring 50 aligned with the longitudinal axis 14 allows the distal end of the spring portion 55 to face the guide slope 44 of the flange plate 35 in the direction along the longitudinal axis 14.

In assembling of the tube assembly 1, the metal tube 11 is inserted inside the wire braiding 15.

Figure 5:
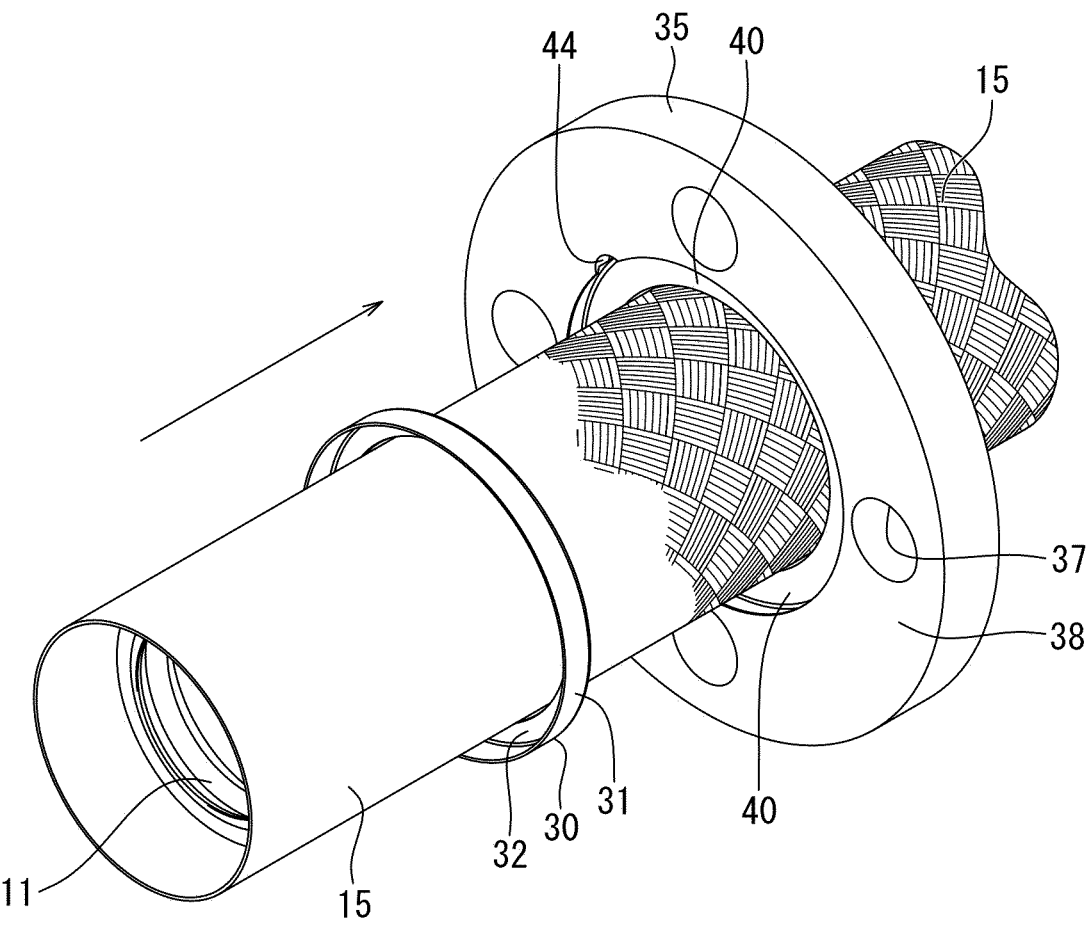
FIG. 5 shows a process of assembling the flange plate and the outer ring on the wire braiding.

Next, as shown in FIG. 5, the flange plate 35 and the outer ring 30 are mounted in this order on the wire braiding 15 from the distal end of the wire braiding 15. In this condition, the flange plate 35 is oriented such that one major surface 38 with the recessed step 40 faces the associated distal end of the wire braiding 15. The outer ring 30 is oriented such that the radial ring portion 32 positions away from the distal end of the wire braiding 15 than the peripheral ring portion 31.

Figure 6:
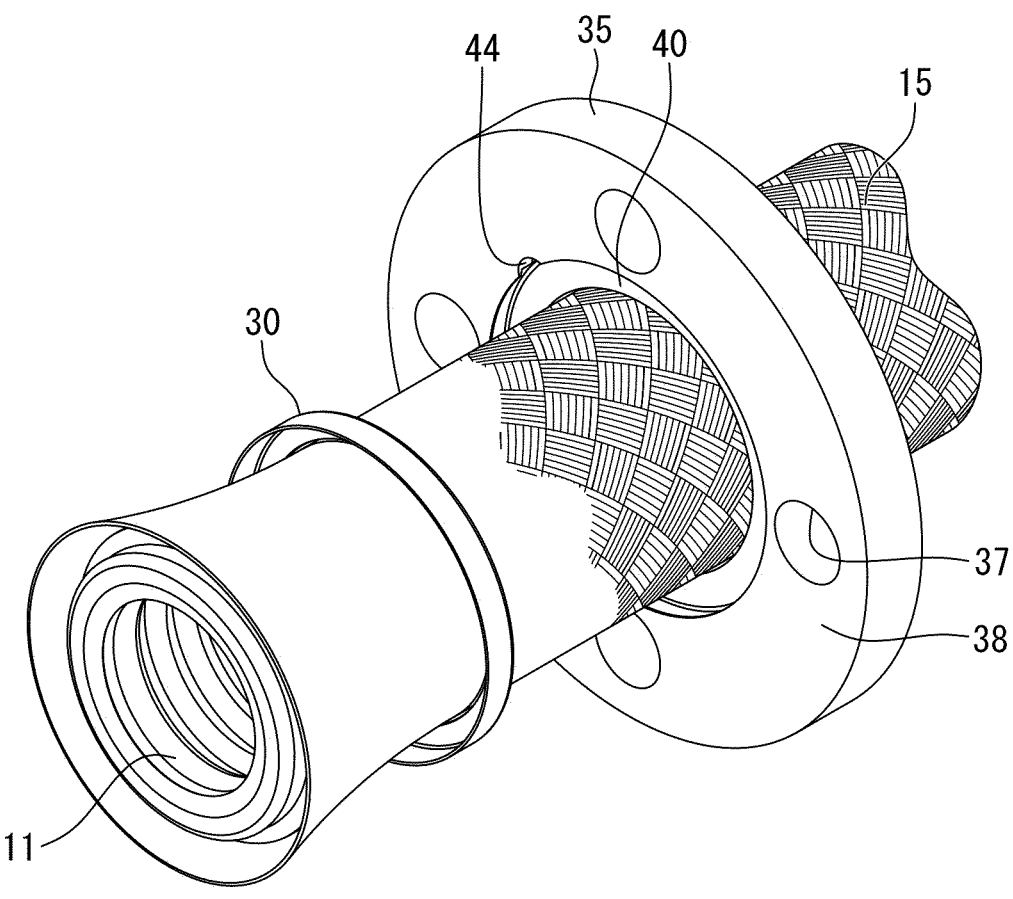
FIG. 6 shows a process of mounting the outer ring and the flange plate on the inner ring.

Next, as shown in FIG. 6, the distal end of the wire braiding 15 is diametrically enlarged in the form of trumpet. In this condition, two halves 23 of the inner ring 16 is fitted in one of the small diameter portion 13. Preferably, as shown in FIG. 3, the inner ring 16 is fitted in the second small diameter portion 13 counting from the distal end of the wire braiding 15, leaving two large diameter portions 12 and one small diameter portion 13 on the distal side of the inner ring 16.

Next, the outer ring 30 and the flange plate 35 are pressed toward the inner ring 16, preferably by using an exclusively designed pressing tool not shown, causing the outer ring 30 to be securely fitted around the inner ring 16 with the wire braiding 15 held between the inner ring 16 and the outer ring 30. In the embodiment, the surface portion 23 of the inner ring 16 and the tapered wall portion 41 of the recessed step 40, opposing to each other, are tapered at substantially the same taper angle and, therefore, pressing the flange plate 35 toward the inner ring 16 by the pressing tool 60 causes the radial ring portion 31 of the outer ring 30 to be angled by being compressed between the tapered portions 23 and 41 and thereby the wire braiding 15 to be held firmly between the inner and outer rings 16 and 30.

Next, the distal end portion of the metal tube 11, projecting distally from the inner ring 16, is compressed on the outer radial surface portion 20 of the inner ring 16, preferably by using an exclusively designed pressing tool not shown.

Next, preferably, the distal end portion of the wire braiding 15, projecting from the inner ring 16 and the outer ring 30, is cut off by using an appropriate cutting machine such that no wire projects from the inner ring 16 and the outer ring 22.

Figure 7:
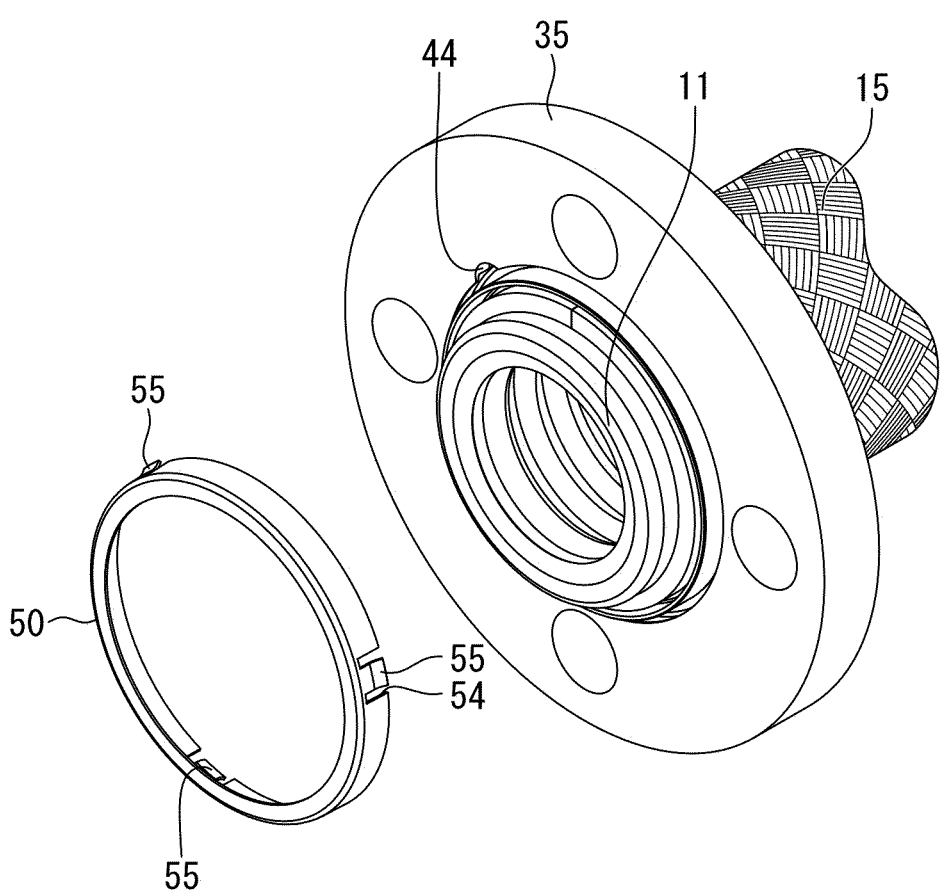
FIG. 7 shows a process assembling the cover ring to the flange plate.
Figure 8:
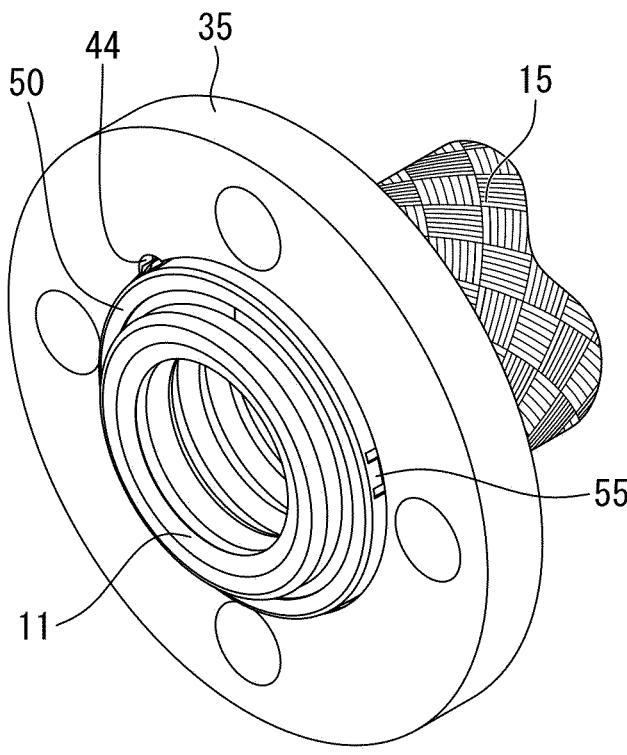
FIG. 8 shows a process assembling the cover plate to the flange plate.
Figure 9:
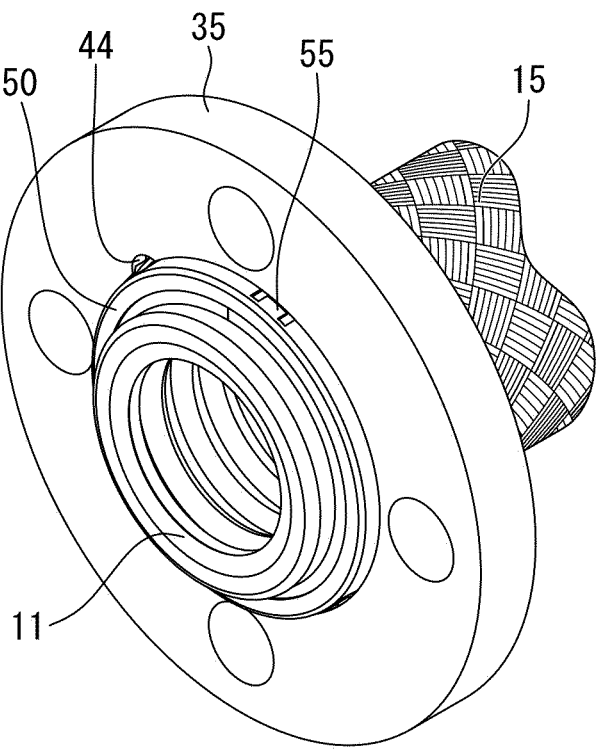
FIG. 9 shows a process assembling the cover plate to the flange plate.

Finally, as shown in FIGS. 7-9, the cover ring 50 is mounted on and around the compressed metal tube potion. In this process, the cover plate 50 is inclined and two of three spring portions 55 are engaged on the annular projection 43 of the flange plate 35 with the remaining one spring portion 55 facing the guide slope 44 of the flange plate 35. Subsequently, the cover ring 50 is pivoted about the two engaged spring portions 55 to cause the remaining one spring portion 55 to be guided across the guide slope 44 and the snap-fitted into engagement with the annular projection 43.

Preferably, as shown in FIGS. 8 and 9, the cover ring 50, engaged with the flange plate 35, is rotated relative to the flange plate 35 about the longitudinal axis 14 to move the spring portion 55 away from the guide slope 44, preventing the cover ring 50 from being dropped from the flange plate 35. This results in that the cut ends of the wires of the wire braiding 15 are surrounded and unexposed by the cover ring 50, preventing operators from being injured by the contact with the cut ends of the wire braiding 15.

The tube assembly 1 so assembled is connected, at opposite ends of the tube assembly, with another tube assemblies. In this process, as shown in FIGS. 1-3, a suitable gasket 60 is placed on the distal end of metal tube 11 and compressed between the metal tube 11 and another tube to be fluidly connected with the metal tube 11.

Although in the previous embodiment the opposite left and right connection mechanism 10 has the same structures described above, the right connection mechanism may be different from the left connection mechanism. For example, the shape and size of the right flange plate may be different from the shape and size of the left flange plate.

Although in the previous embodiment the inner ring 16 is fitted in the smaller diameter portion 13 while leaving two large diameter portions 12 and one small diameter portion 13 outside the inner ring 16, the number of the of the large diameter portions and small diameter portions outside the inner ring may not be changed.

Although in the previous embodiment, the connecting mechanism 10 is provided on opposite ends of the tube assembly 1, it may be provided only one end of the tube assembly.

What is claimed is:

1. A flexible tube assembly, comprising:
a metal tube comprising large diameter portions and small diameter portions positioned alternately along a longitudinal axis of the metal tube;
a wire braiding mounted around the metal tube;
a mechanism mounted on one end of the meal tube and associated one end of the wire braiding to connect the one end of the metal tube with the associated one end of the wire braiding;
wherein the mechanism comprises a first ring positioned between the metal tube and the wire braiding and fitted in one of the small diameter portions of the metal tube;
a second ring positioned around the first ring and the wire braiding to secure the wire braiding around the first ring;
a first annular member and a second annular member positioned on opposite sides of the first ring and the second ring with respect to a direction along a longitudinal axis of the metal tube, the first annular member and the second annular member being configured to be assembled with each other by approaching toward each other along the longitudinal axis and, in an assembled condition, at least one of the first annular member and the second annular member surrounds cut wire ends of the wire braiding unexposed;
wherein
the first annular member comprises a first engagement portion and the second annular member comprises a second engagement portion,
the first engagement portion and the second engagement portion being configured such that, in the assembled condition, the first engagement portion engages the second engagement portion and the at least one of the first engagement portion and the second engagement portion surrounds the cut wire ends of the wire braiding unexposed; and
the second annular member comprises
an annular recess extending around the longitudinal axis, and
an annular projection defined in a surface defining the annular recess, the annular projection defining the second engagement portion; and
the first annular member comprises
an annular portion extending around the longitudinal axis, and
a plurality of elastically deformable portions configured to elastically engage with the annular projection in the assembled condition, the elastically deformable portion defining the first engagement portion.

2. A flexible tube assembly, comprising:
a metal tube comprising
a first end and a second end,
a longitudinal axis extending between the first end and the second end, and
large diameter portions and small diameter portions positioned alternately along the longitudinal axis between the first end and the second end;
a first ring fitted in one of the small diameter portions adjacent the first end of the metal tube;
a wire braiding mounted around substantially an entire length of the metal tube and around the first ring;
a second ring mounted on a first end portion of the wire braiding mounted around the first ring to secure the first end portion of the wire braiding on the first ring; and
a first annular member and a second annular member positioned on opposite sides of the first ring and the second ring with respect to a direction along the longitudinal axis, the first annular member and the second annular member being configured to be assembled with each other by approaching toward each other along the longitudinal axis and, in an assembled condition, at least one of the first annular member and the second annular member surrounds the first end portion of the wire braiding such that cut ends of wires of the first end portion of the wire braiding are unexposed;

wherein the first annular member is disposed on a first side of the first ring and the second ring, close to the first end of the metal tube, with respect to a direction along the longitudinal axis;

the second annular member is disposed on a second side of the first ring and the second ring, away from the first end of the metal tube than the first side; and in the assembled condition, the first annular member surrounds the first end of the wire braiding; and the second ring comprises portions configured to press the one end portion of the wire braiding on a peripheral surface portion and a radial surface portion of the first ring to hold the one end of the wire braiding between the first ring and the second ring.

3. The flexible tube assembly of claim 2, wherein the first annular member comprises a first engagement portion;

the second annular member comprises a second engagement portion;

the first engagement portion and the second engagement portion are configured such that the first engagement portion is snap-fitted into engagement with the second engagement portion by approaching the first annular member and the second annular member to each other.

4. The flexible tube assembly of claim 3, wherein the second ring comprises a peripheral portion and a radial portion, wherein the peripheral portion and the radial portion are configured to press and hold the first end portion of the wire braiding on an associated peripheral surface portion and an associated radial surface portion of the first ring, respectively.

5. The flexible tube assembly of claim 2, wherein the second annular member comprises an annular recessed step defined in an inner peripheral corner of the second annular member, closer to the first end of the metal tube, wherein the annular recessed step comprises a radial portion opposing the radial portion of the second ring and a peripheral portion opposing the peripheral portion of the second ring, wherein the peripheral portion comprises an annular projection projecting radially inwardly from the peripheral portion and extending around the longitudinal axis, wherein the annular projection comprises a guide slope defined in a portion of the annular projection and inclined radially inwardly in a direction from the first end toward the second end along the longitudinal axis, wherein the first annular member comprises a peripheral portion opposing a peripheral surface portion of the first ring and a radial portion opposing the radial surface portion of the first ring, wherein the peripheral portion of the first annular member has an outer diameter substantially the same as an inner diameter of the annular projection of the second annular member, wherein the peripheral portion of the first annular member comprises at least three elastically deformable engaging portions disposed around the longitudinal axis at a regular interval, wherein the at least three elastically deformable engaging portions are projected outwardly from an outer peripheral surface of the peripheral portion of the first annular member, wherein the first annular member is assembled with the second annular member by leaving one of the at least three elastically deformable engaging portions unengaged with the annular projection, and letting remainders of the at least three elastically deformable engaging portions, other than the one of the at least three elastically deformable engaging portions, engage with the annular projection, and from this condition, pressing the first annular member toward the second annular member, causing the one of the at least three elastically deformable engaging portions to slidingly move on the guide slope and snap-fit into engagement with the annular projection.

* * * * *